Jan. 27, 1942.   T. F. SPACKMAN   2,270,977
MOTOR VEHICLE HEATER
Filed Sept. 22, 1938
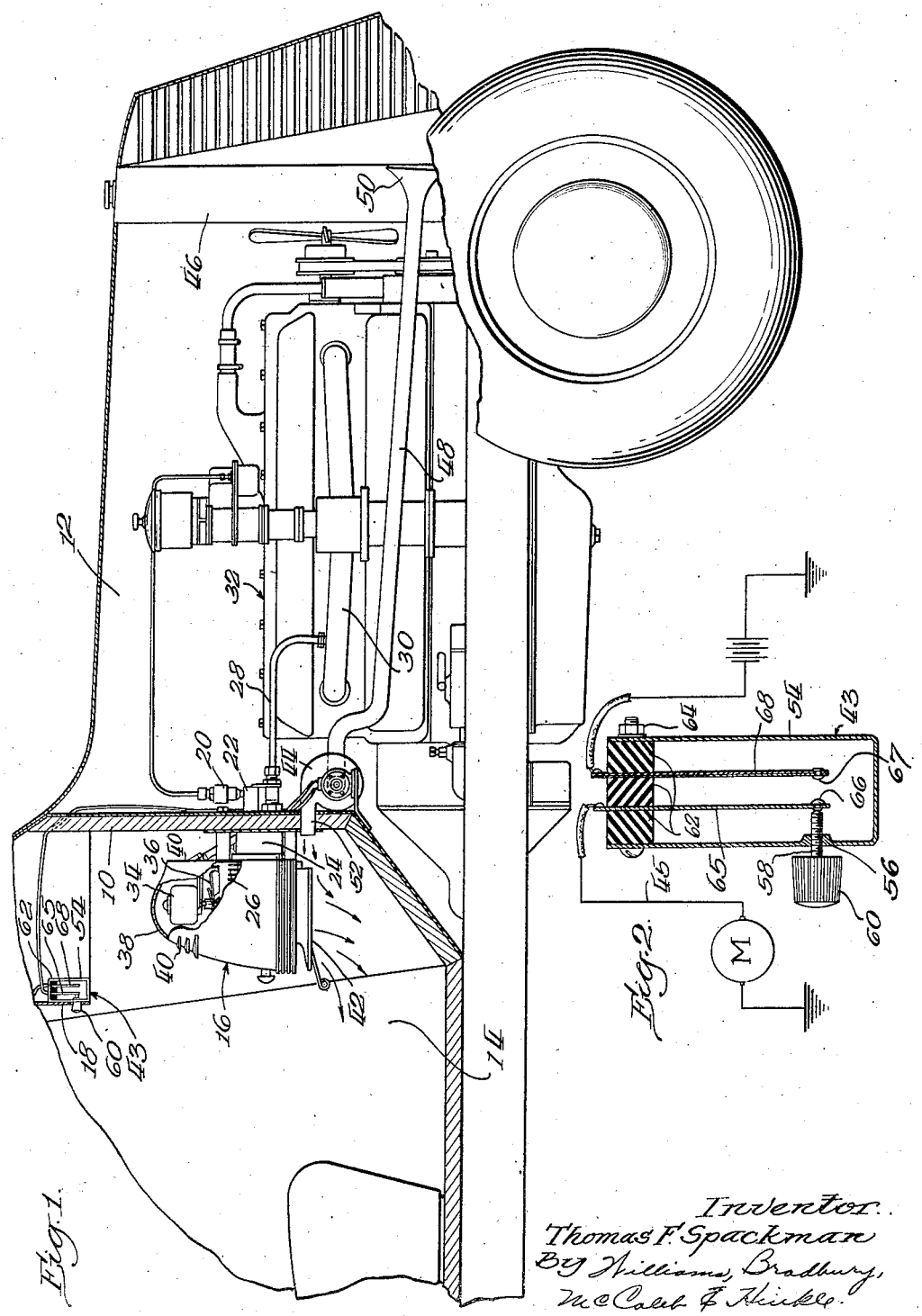
Inventor
Thomas F. Spackman
By Williams, Bradbury,
McCaleb & Hinkle
Attys.

Patented Jan. 27, 1942

2,270,977

UNITED STATES PATENT OFFICE 2,270,977

MOTOR VEHICLE HEATER

Thomas F. Spackman, Chicago, Ill., assignor to Stewart-Warner Corporation, Chicago, Ill., a corporation of Virginia Application September 22, 1938, Serial No. 231,230

1 Claim. (Cl. 98—2)

The invention relates generally to heating equipment for motor vehicles and the like, and more particularly to ways of supplying fresh air to the riding compartment of a vehicle for use in conjunction with a heater to add to the comfort of the passengers.

Heretofore wind seals for the doors and windows of a motor vehicle have been sufficiently imperfect to permit a substantial interchange of the air on the outside and the air on the inside of the riding compartment. This interchange in many ways was desirable under normal conditions because it provided means for replenishing the air in the riding compartment and removing therefrom the vitiated air. However, the drafts present with this interchange were objectionable, and with improvements in seals designed to eliminate such drafts, the air in the riding compartment soon became stuffy and close.

Moreover, with heaters of a capacity designed to heat the air inside the compartment quickly, the temperature of the air would become uncomfortable after a short time of full heater operation, and when the heater is turned down the warm air convectively stagnates around the heads of the passengers. Then, if, in order to remove this unpleasantness, windows are opened, drafts occur and other discomforts are experienced.

Furthermore, the moisture content of the air in the compartment rises upon occupancy and with stagnation of the air condensation upon the windshield and windows takes place. Also, when the heater is turned down more thermal units are available in the radiator for the lesser amount of air circulated over the radiator and the air supplied at the lesser rate is much warmer.

Also of importance is the fact that the improved seals for the automobile make the riding compartment a more or less sealed container in which pressure can be developed if air is injected into the compartment under pressure. This difficulty was exemplified in the past by the difficulty experienced for a while in closing the doors before suitable relief vents were provided. However, the vents which are provided for door closing purposes only operate when there is appreciable pressure inside the riding compartment. Otherwise, if there is no pressure, the vitiated air in the compartment remains there, to the discomfort of the passengers.

Consequently, one of the objects of the invention is to moderate the heated air supplied to a sealed riding compartment when the temperature of the air in the compartment approaches the comfort level.

Another object of the invention is to moderate the heated air supplied to the riding compartment by a heater when the speed of air circulation induced by the heater is reduced.

Another object of the invention is to provide a means for boosting the speed of air circulation inside a riding compartment when the temperature of the air therein approaches or exceeds the comfort level.

Another object of the invention is to provide an auxiliary air circulating device which assists the heater in a riding compartment to increase the speed of air circulation in the riding compartment when the temperature of the air in the compartment reaches a predetermined point which may be varied at will.

Another object of the present invention is to provide a heating system for sealed riding compartments wherein fresh air is forced under pressure into a pressure vented riding compartment in a manner moderating the air supplied by the heater to replace the vitiated air in the compartment.

Another object of the invention is to provide a heating system for sealed riding compartments wherein the heating and the circulation of air in the compartment is carried on independently of air pressure differentials existing between the air inside and outside of said compartment and fresh air is supplied under pressure to the compartment to condition the air supplied by the heater and to replace the vitiated air in the compartment.

Another object of the invention is to provide a device of the class described which is simple in construction and operation, thoroughly effective in its use, and inexpensive to manufacture and operate.

These being among the objects of the invention, other and further objects will become apparent from the drawing herein, the description relating thereto, and the appended claim.

Referring to the drawing:

Figure 1 is a side elevation of the engine compartment and the front part of the riding compartment of a motor vehicle showing a preferred installation of the invention; and Figure 2 is an enlarged section of the thermostatic control and the electric circuit involved in the invention.

Referring to Figure 1, a motor vehicle having a dash 10 separating the engine compartment 12 from the riding compartment 14 is shown with a heater 16 mounted upon the dash below the instrument panel 18.

Reference may be had to the co-pending application of Henry J. De N. McCollum, Serial No. 61,213, filed January 28, 1936, which has matured into Patent No. 2,191,173, dated February 20, 1940, for the structural characteristics of the heater 16, wherein, briefly, an air and fuel mixture supplied by the carburetor 20 is drawn through the mixing chamber 22 into the combustion chamber 24 where the mixture is burned to form hot gases which, in turn, are drawn into the radiator 26 and discharged through a tube 28 into the intake manifold 30 of the engine 32 under the force of the vacuum created in the manifold.

A motor 34 and a fan 36 driven thereby are located inside a shell 38 which houses the radiator 26 of the heater 16 and air drawn into the shell through the opening 40 is propelled over the radiator 26 in heat exchange relationship and returned to the interior of the passenger compartment 14 through the bell-like deflector 42.

The heat capacity of the radiator is high and in this way air present inside the riding compartment 14 is rapidly heated for passenger comfort when the heater is started. Thereafter, the air is repeatedly heated and kept in constant circulation for the comfort of the passengers. However, it will be appreciated that not long after the heater has been functioning the temperature of the air will rise above the comfort point if the heater is permitted to continue at full operation. A thermostatic switch 43 is mounted on the instrument panel 18, or some other suitable place, and the switch set to close a circuit 45 which controls a blower 44 when the comfort level is reached. The blower 44 derives its supply of fresh air from in front of the engine cooling radiator 46 where the intake tube 48 ends in a widened mouth 50. The mouth 50 faces into the air stream developed by the forward movement of the vehicle and with the pressure built up thereby at the mouth, fresh air is supplied in large quantities to the compartment 14 when the blower 44 is brought into operation to force air through the conduit 52 into the path of the heated air coming from the heater 16. As a result, when the heater and blower are both in operation, a turbulence is created by the conflicting paths of air movement developed by them respectively, whereby the hot air supplied by the heater is moderated by the cold air supplied by the blower, and the cold air in turn is tempered by the hot air so that neither source of air supply provides a dominating draft.

In addition to this, the speed of circulation of air inside the riding compartment 14 is increased when the blower 44 is brought into operation and since the blower 44 is in operation for all temperatures above and including the comfort level, the increase of the speed of air prevents stagnation of warm air in the top of the riding compartment, and thereby also prevents the condensation of moisture upon the windshield.

Moreover, any back pressures that might be created inside of the riding compartment by the injection of fresh air under blower pressure in no way impairs the air circulation developed by the heater, since the fan 36 and motor 34 of the heater 16 are in no way burdened to supply air under pressure to the compartment. Not only this, but the blower 44 develops a pressure which operates to replace progressively the vitiated air inside the compartment by forcing the vitiated air out of pressure vents provided for permitting easy closing of the doors.

Furthermore, the extra hot air developed by the heater when the speed of circulation is turned down is tempered in proportion to the increase of heat which it receives by the air supplied by the blower. That is to say, with the supply of fresh air from the blower 44 constant, more fresh air per volume will be added by the blower to the heater air when the speed of circulation of the heater air is low and the temperature thereof is high than will be supplied by the blower when the speed of circulation of the heater air is high and the temperature thereof is low. Thus, whether the air supplied by the heater is comparatively hot or merely warm, the air supplied for passenger comfort by the heater and the blower combined is of a substantially uniform temperature throughout the operation of the system, regardless of changes in the temperature of the air supplied by the heater.

Referring to the thermostatic switch 43 for certain details of its construction, a U-shaped housing 54 open at both sides for free circulation of air, is provided with a threaded aperture 56 upon one side thereof in which is threadedly received a screw 58 manually driven by knurled head 60. An insulating block 62 is disposed between the open ends of the U-shaped housing where it is held in place by the nut and bolt assembly 64 and the insulating block in turn supports a spring 65 carrying a contact 66 which can be varied in position by turning the screw 58. Cooperatively mounted with the spring contact 66 is a bi-metal leaf 68 carrying a contact 67 which, under the influence of temperature changes, is moved to and from the contact 66. Thus, the temperature at which the circuit controlling the blower is closed is varied at will by the knurled head 60 being turned one way or the other so that the effective temperature of the air supplied by the blower and heater together may be varied at will.

Consequently, although a single embodiment of the invention has been shown and described herein, it will be apparent to those skilled in the art that various and further uses, modifications and changes may be made without departing from the spirit and substance of the invention, the scope of which is commensurate with the appended claim.

What is claimed is:

In a heating system for the riding compartment of a motor vehicle or the like, the combination of a heat exchange unit mounted in said compartment, means for circulating air inside of the compartment over said heat exchange unit and returning said circulated air along a predetermined path, an air injector for supplying air to said compartment from outside the said compartment, means propelling all said outside air supplied to said compartment into the path of air circulated by the circulating means immediately adjacent the outlet thereof, and temperature responsive means proximate the intake of said air circulating means for measuring the temperature of said compartment and controlling said supply of fresh air to said compartment.

THOMAS F. SPACKMAN.